United States Patent [19]
Otto

[11] 3,844,024
[45] Oct. 29, 1974

[54] METHOD OF MOUNTING COMPONENTS OF A DYNAMOELECTRIC MACHINE

[75] Inventor: Charles W. Otto, De Kalb, Ill.

[73] Assignee: General Electric Company, Fort Wayne, Ind.

[22] Filed: Sept. 17, 1973

[21] Appl. No.: 397,693

Related U.S. Application Data

[63] Continuation-in-part of Ser. No. 246,219, April 21, 1972, abandoned.

[52] U.S. Cl............... 29/471.3, 29/503, 29/596, 164/110, 164/111, 310/42, 310/89, 310/258
[51] Int. Cl............................................ B23k 31/02
[58] Field of Search .......... 29/596, 598, 471.1, 503, 29/471.3; 310/42, 89, 43, 258, 259; 164/108, 110, 111

[56] References Cited
UNITED STATES PATENTS

| | | |
|---|---|---|
| 1,735,809 | 11/1929 | Tebyrica .......................... 29/503 X |
| 3,313,967 | 4/1967 | Ross .............................. 310/258 X |
| 3,482,125 | 12/1969 | Fleckenstein ........................ 310/42 |
| 3,629,933 | 12/1971 | Sirmay ............................ 29/503 X |
| 3,705,994 | 12/1972 | Berry, Jr. .......................... 310/91 |

OTHER PUBLICATIONS

"Joining Parts By Die Casting," Machine Design, 4-15-71, pages 93-95.

Primary Examiner—C. W. Lanham
Assistant Examiner—Carl E. Hall

[57] ABSTRACT

A method of mounting a structural component of a dynamoelectric machine to a stationary member thereof. A set of beams is mounted to the stationary member, and the beams are positioned within receiving means provided therefor in the structural component. Molten metal is introduced into the receiving means for mounting engagement between the beams and the receiving means, and the metal solidifies thereby forming means for holding the beams and the receiving means in mounting engagement.

20 Claims, 14 Drawing Figures

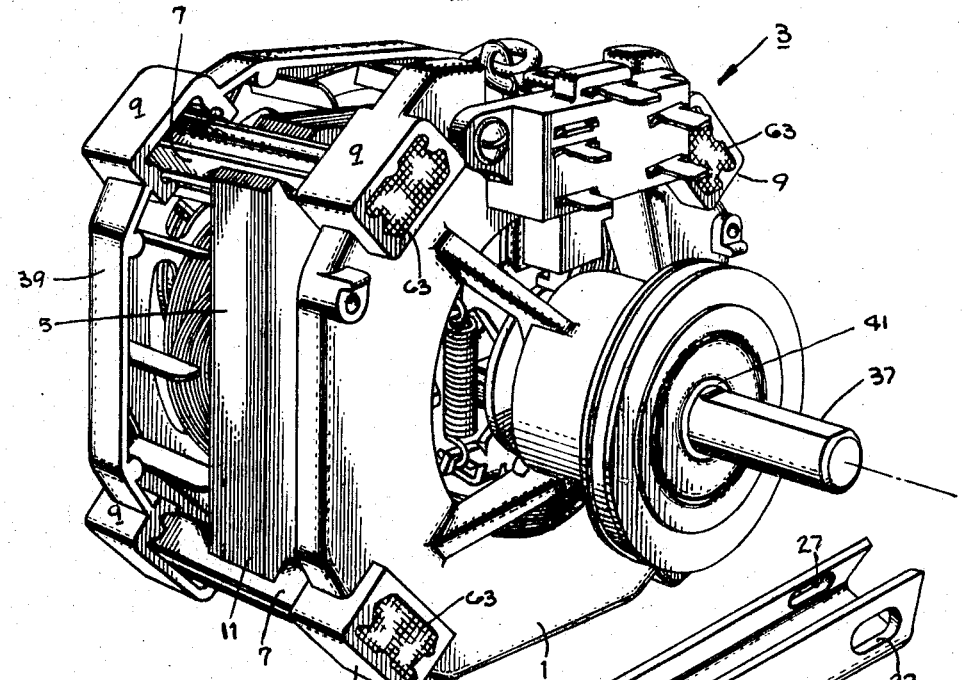
FIG.1
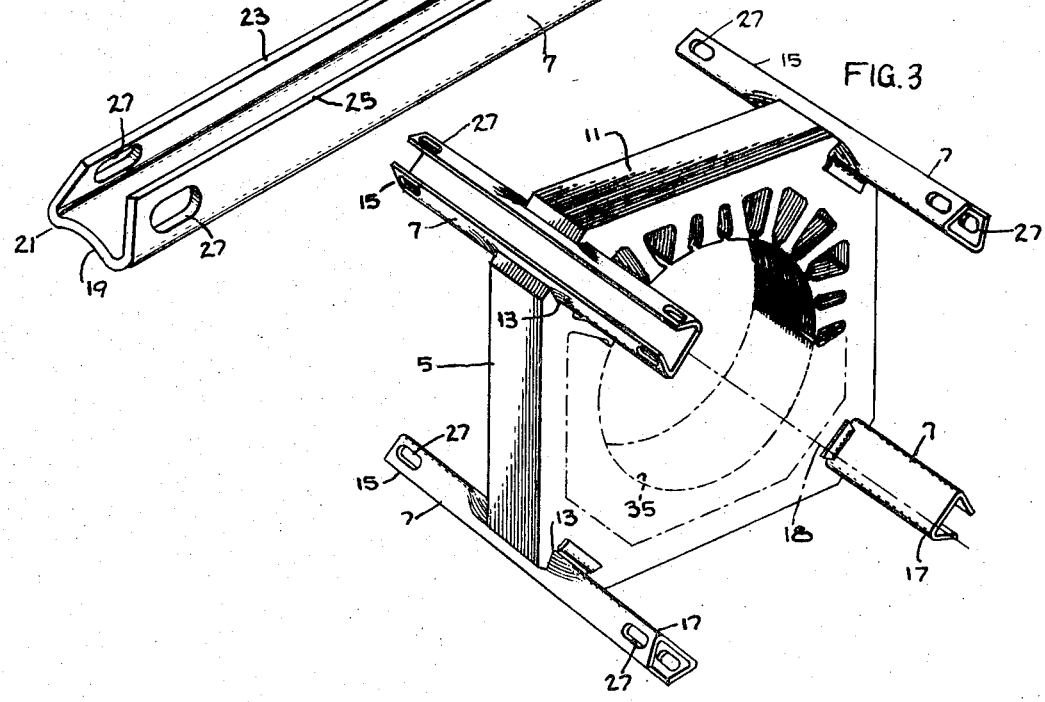
FIG.2
FIG.3

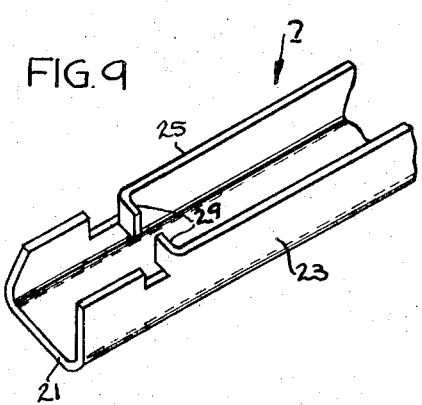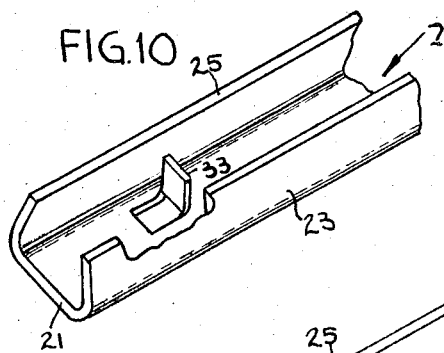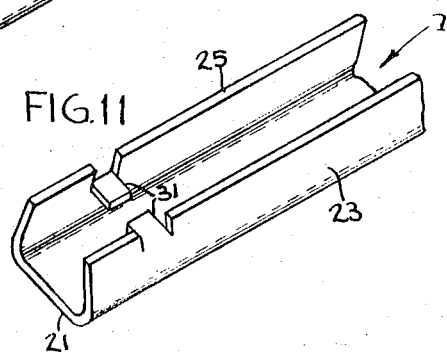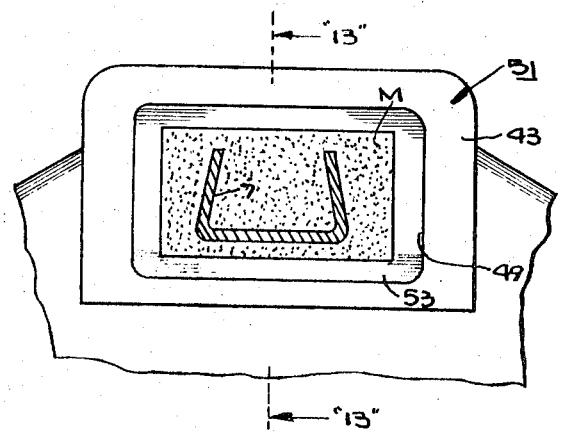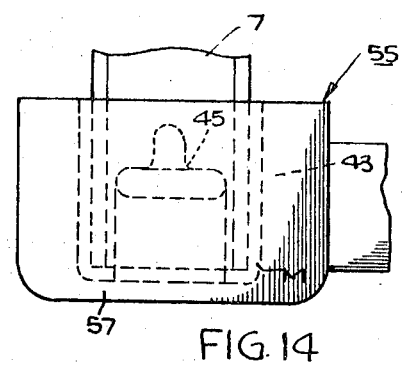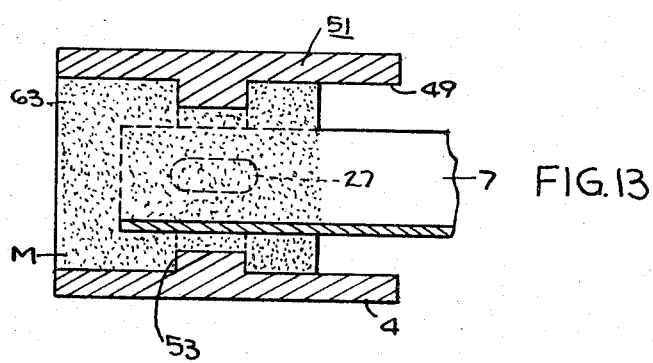

3,844,024

METHOD OF MOUNTING COMPONENTS OF A DYNAMOELECTRIC MACHINE

CROSS REFERENCE TO RELATED PATENTS

This application is a continuation-in-part of copending application Ser. No. 246,219 filed Apr. 21, 1972, now abandoned which is specifically incorporated herein in its entirety.

FIELD OF THE INVENTION

This invention relates generally to dynamoelectric machines and in particular to methods of mounting components thereof.

BACKGROUND OF THE INVENTION

As well known in the art, dynmoelectric machines are generally provided with a rotatable member or assembly, generally referred to as a rotor, a stationary member, generally referred to as a stator, in which the rotatable member is received, and structural components, such as opposite end frames or shields, which are secured to the stationary member and rotatably support or journal the rotatable member.

In dynamoelectric machines of the type just described, it is most important that the rotor and stator be mounted or assembled during manufacture in proper radial and axial alignment, and that such be done expeditiously and inexpensively. Improper radial alignment results in undesirable eccentricity in an annular air gap between the rotor and magnetic core while improper axial alignment produces undesirable excessive axial rotor thrust. It is also important that the end frames be properly aligned with the stator and rotor to ensure longevity for the bearing means of the end frames.

In the past, several different methods of assembling dynamoelectric machines with the rotor thereof properly positioned within the stator and with the end frames properly mounted with respect to the stator and rotor having the bearing means thereof for supporting engagement with the rotor mutually aligned along a common axis. For example, stators have been connected to end frames by through-bolts; however, proper radial alignment here is achieved principally through close tolerance fits between the dynamoelectric components. With such methods, the tighter the tolerances are held, the more accurate the resulting alignment; however, one of the disadvantageous or undesirable features of such method is that close tolerances not only are costly to effect during manufacture but also impede assembly.

Another method of mounting components of a dynamoelectric machine was one in which an oversized dummy rotor was used to assemble and align the dynamoelectric machine components with an actual rotor being subsequently substituted after alignment between rotor and stator was achieved. Such use of dummy rotors, however, was limited to "unit bearing" type machines, that is dynamoelectric machines in which the rotor is supported at one end only. A disadvantageous or undesirable feature of this method was that it was unavailable for use with the great majority of dynamoelectric machines wherein the rotor is rotatably supported at both ends of its shaft in opposite end frames.

U.S. Pat. No. 3,165,816 disclosed a different approach to assembling dynamoelectric machines. Shims were arranged in the air gap between rotor and stator, and opposite end frames were disposed adjacent the end faces of the stator in journaling engagement with the rotor. The stator and end frames were then bonded together with an adhesive bonding material, such as a thermosetting resin or the like, thereby securing the stator and end frames together upon curing of the adhesive. While this method provided satisfactory attachment or mounting of the dynamoelectric machine components, one of the disadvantageous or undesirable features thereof was that the problems generally associated with the use of adhesives were, of course, present.

U.S. Pat. No. 3,705,994 disclosed a method by which the end portions of a set of beams attached to a stator of a dynamoelectric machine were welded to a pair of opposite end frames; however, while the patent undoubtedly disclosed at least some advantageous features, one of the disadvantageous or undesirable features thereof was that the welds establish stresses upon cooling which tend to distort the preferred alignment of the dynamoelectric machine components, as is well known in the art.

A principle object of the present invention is to provide a method of mounting a structural component of a dynamoelectric machine to a stationary member thereof which overcomes the disadvantageous or undesirable features set forth hereinabove with respect to such past methods, and this, as well as other objects and advantageous features of the present invention, will in part be apparent and in part be pointed out in the specification which follows.

SUMMARY OF THE INVENTION

In general, a method in one form of the invention for mounting a structural component of a dynamoelectric machine to a stationary member thereof is practiced by mounting a set of beams to the stationary member and positioning end portions of the beams within receiving means provided therefor in the structural component. Molten metal is then introduced into the receiving means for mounting engagement between the end portions of the beams and at least a portion of the receiving means. The molten metal is then solidified thereby forming means for holding the beam end portions and the receiving means in mounting engagement.

BRIEF DESCRIPTION OF THE DRAWINGS

FIG. 1 is a perspective view of a dynamoelectric machine in which a structural component and a stationary member thereof are mounted together by utilization of principles of methods of the present invention;

FIG. 2 is a perspective view of a beam member of the stationary member shown in FIG. 1;

FIG. 3 is a perspective view of four beam members of FIG. 2 rigidly mounted to the stationary member of the dynamoelectric machine shown in FIG. 1;

FIGS. 9, 10 and 11 are perspective views of an end portion of the beams illustrating alternate means thereon for gripping or displacement preventing engagement with the solidified metal in the receiving means of the structural component.

Corresponding reference characters indicate corresponding parts throughout the several views of the drawings.

The following examples illustrate the invention and shall be interpreted as illustrative and not in a limiting sense.

DESCRIPTION OF THE PREFERRED EMBODIMENT

Figure 5:
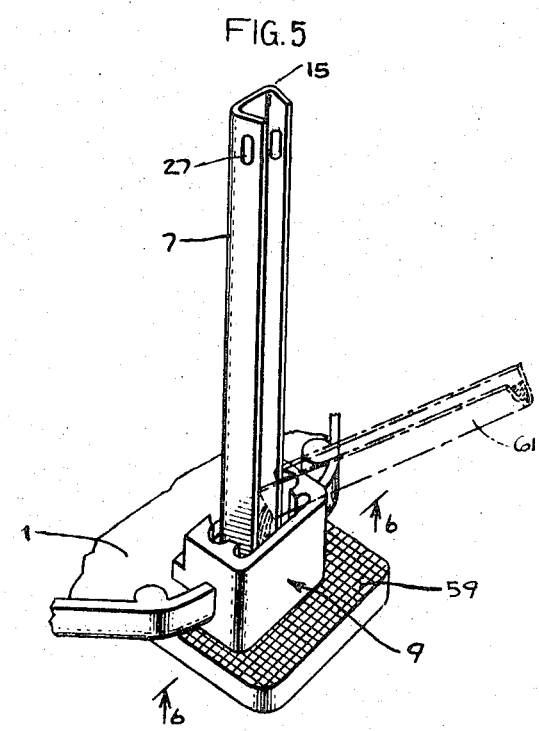
FIG. 5 is a fragmentary perspective view of the structural component shown in FIG. 4 with a portion of one of the beams shown in FIG. 3 positioned in receiving means provided therefor in the structural component and with molten metal being poured into the receiving means to rigidly secure the beam and the structural component together.

Referring now to the drawings in general, there is shown a method of mounting a structural component, such as an end frame or shield 1, of a dynamoelectric machine, such as an electric motor or the like, to a stationary member, such as a stator or core 5, thereof (FIG. 1). A plurality or set of generally rigid elongate members, such as generally U-shaped beams 7, are mounted to stator 5 (FIG. 3), and end portions of the beams are positioned within receiving means, such sockets 9, provided therefore in end frame 1 (FIG. 5). Molten metal M is then introduced into sockets 9 for mounting engagement between the end portions of beams 7 and at least a portion of the sockets (FIGS. 5-8).

More particulary, and with reference to FIGS. 2 and 3, stator 5 is provided with an outer peripheral surface 11 having a plurality of means, such as grooves 13 therein, for supporting beams 7. Beams 7 are respectively positioned in grooves 13 with the opposite end portions 15, 17 of the beams projecting from each of the opposite faces of stator 5 and with portions intermediate the projecting end portions received or disposed within the grooves.

Beams 7 are then rigidly secured, attached or mounted to stator 5 by suitable means well known in the art such as staking, press-fitting or the like, and such mounting of the beams is preferably accomplished by flattening a pre-crimped wedge or raised ridge or rib portion 19 generally centrally provided in a base 21 of the beam thereby to separate a pair of opposite elongate sides or flange portions 23, 25 integrally formed with the base wall. In this manner, intermediate portions of sides 23, 25 generally centrally of beams are urged or moved into displacement preventing engagement with the generally complementary shaped and confronting opposite side walls of grooves 13. Gripping means, such as openings or aperture 27 are provided through at least one of beam sides 23, 25 adjacent end portions 15, 17 of beams 7 for gripping or displacement preventing engagement with metal introduced into sockets 9, as discussed hereinafter. Of course, other such gripping means are also contemplated as being within the scope of the invention, and alternative gripping means are also illustrated for purposes of example in FIGS. 9-11. In FIG. 9, wings or tabs 29 are lanced or slit in beam sides 23, 25 and bent inwardly therefrom into the beam channel and in FIG. 10, other wings or tabs 31 are also lanced or slit in the beam side and bent downwardly therefrom into the beam channel. Of course it is apparent that only one tab may be formed in one of beam side walls 23, 25 and bent therefrom. In FIG. 11, a tab 33 is lanced or slit in the base 21 of beam 7 and bent upwardly therefrom into the channel of the beam. While tabs 29, 31 and 33 of FIGS. 9-11, respectively, are all shown bent into the channel of beam 7, it may be noted that the tabs could also be bent away from the channel of the beam providing, of course, that the tabs may be accommodated within sockets 9 of end frame 1. Referring back to FIGS. 1 and 2, stator 5 is provided with a bore 35 in which a rotor (not shown) is adapted to be received, and the rotor is mounted on a shaft 37 which is rotatably supported or journaled in end frame 1 and opposite end frame 39, said rotor and shaft constituting a rotatable assembly 37 or movable member of dynamoelectric machine 3, as well known in the art.

Figure 4:
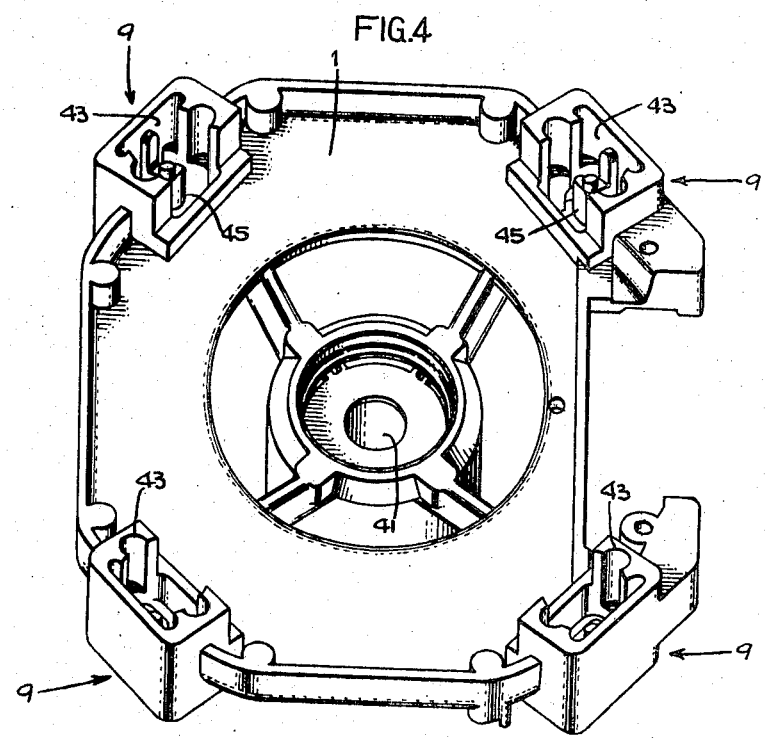
FIG. 4 is a perspective view of the structural component of the dynamoelectric machine shown in FIG. 1.
Figure 6:
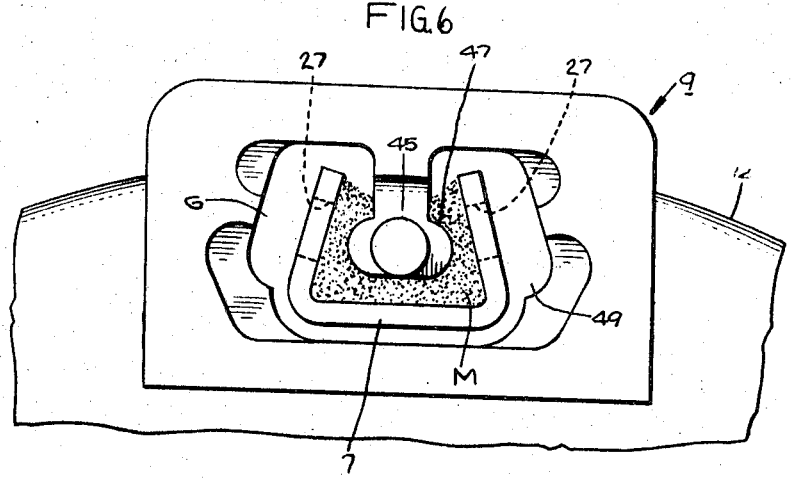
FIGS. 6, 7 and 8 are sequential views of FIG. 5 and illustrating the filling of the receiving means taken along line 6—6 by the molten metal but with the flow chute removed for clarity.
Figure 7:
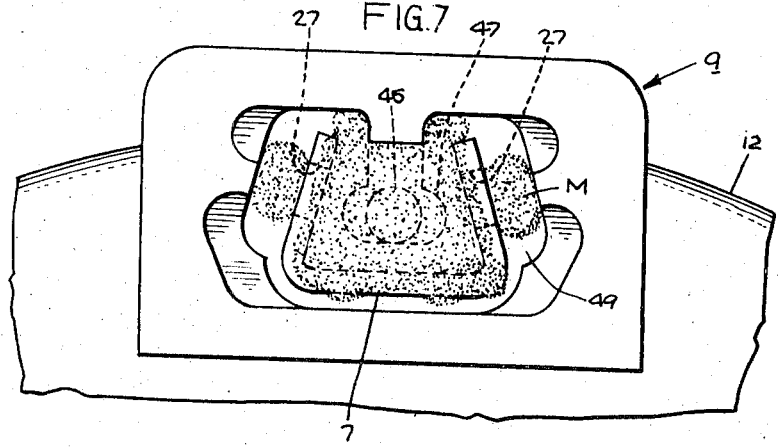
Figure 8:
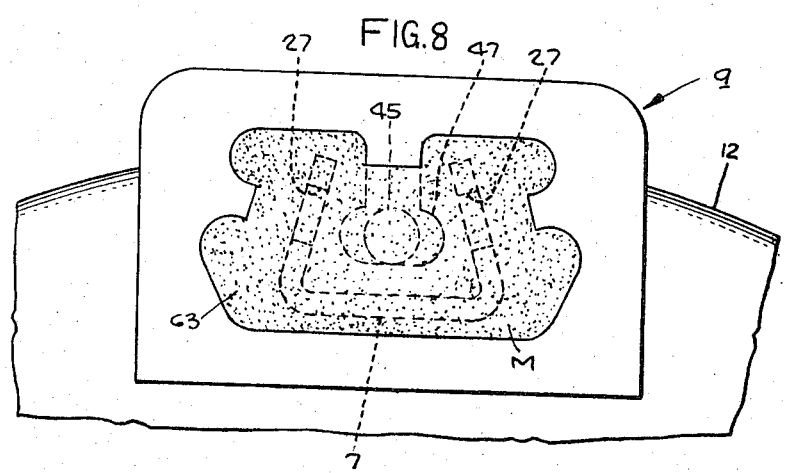

End frame 1, as also shown in FIG. 4, is preferably composed of an aluminum alloy, such as that known commercially as A-380 or the like, but it is contemplated that the end plate may be made from other materials; however, irrespective of the material of which the end frame is made, it must have a melting point in excess of that of the molten metal M which is introduced into end frame sockets 9, as discussed hereinafter. Bearing means, such as sleeve bearing 41, or the like is centrally provided in end frame 1 and its cooperating opposite end frame 39 for journaling or rotatably supporting shaft 37. Sockets 9 are provided in both end frames 1, 39 extending therethrough adjacent their peripheral outer peripheral portions, but for purposes of simplicity only the sockets of end frame 1 are shown in detail and described hereinafter. Sockets 9 are generally defined by side wall portions 43 which are integrally formed with end frame 1 extending generally axially outwardly therefrom socket side walls 43 are predeterminately shaped so as to provide integrally formed portions or gripping means, such as studs 45, extending therefrom to generally bifurcate at least a part of socket 9, and heads or cross-members 47 are integrally provided on the studs adjacent the distal or free ends thereof within the sockets for gripping engagement with metal M introduced thereinto, as shown in FIGS. 6-8 and described hereinafter. Socket side walls 43 and studs 45 thereof define passage 49 which extend through sockets 9, and the shape of the passages is preferably generally complementary to that of end portions 15, 17 of beams 7 which are adapted to be received therein; however, it is contemplated as being within the scope of the invention to provide passages through the sockets having shapes other than generally complementary to those of the beams. For instance, in FIGS. 12 and 13 there is shown alternative receiving means, such as socket 51 having gripping means, such as flange 53 or the like, integrally formed with and extending from side wall 43 of the socket, and while flange 53 is shown continuously formed about passage 49, it is also contemplated that the flange could be interrupted, i.e. in the form of one or more smaller flanges. It is also contemplated that the sockets of end frames 1, 39 may be closed at one end thereof, and such alternative socket 55 is shown in FIG. 14. Socket 55 is substantially the same as socket 53 except an end wall 57 is integrally formed with side walls 43 thereby to form a cap or the like for holding metal M introduced thereinto, as discussed hereinafter.

Referring now to FIGS. 5–8, a method of this invention of rigidly securing projecting end portions 15, 17 of beams 7 within sockets 9 of end shield 1 is illustrated. End shield 1 is placed on a fixture (not shown) having asbestos pads 59 urged by springs or resilient means or the like (not shown) flush against the bottom of sockets 9, as shown in FIG. 5. The rotatable assembly may now be mounted on the fixture in a predetermined position, and stator 5 is placed on the fixture above end frame 1 with its bore 35 predeterminately disposed about the rotatable assembly and with each of projecting end portions 15 of beams 7 received or positioned within mating socket 9. Each beam 7 is inserted well into its mating socket 9 to terminate just short of the surface of the asbestos pads 59 and preferably without contact being made therewith or with side walls 43 of the socket or socket stud 45. Confronting apertures 27 of beam projecting end portions 15 are thereby positioned about opposite sides of socket stud 45, and in this position, an air gap G exists between the beam projecting end portions within the sockets and with side walls 43, studs 45 and asbestos pads 59.

Next, metal M, such as aluminum, lead, zinc or alloys thereof, zinc alloy, preferably Zamak No. 3 currently offered for sale by the New Jersey Zinc Company of Gloucester City, New Jersey, which carries the ASTM designation of B240, alloy AG40A, is melted and introduced or poured from a ceramic ladle or chute 61, as shown in phantom lines in FIG. 5, into the channel portions of beams 7 which provide a passage therefor just above the top of sockets 9. As seen in FIG. 6, molten metal M flows downwardly within the channel of beams 7 towards asbestos pads 59. As molten metal M reaches the bottom of socket 9, it spreads laterally through beam apertures 27 and out from under end portions 15 of the beams, as shown in FIG. 7. Molten metal M then flows into contact with side walls 43 of sockets 9 completely enveloping socket studs 45, and within a predetermined period of time, the molten metal cools and solidifies within the sockets, thereby to form holding means or rigid connections such as metallic plugs 63, for mounting engagement between end frame 1 and beams 7. It may be noted that forming plugs 63 about socket studs 45 and beam apertures 27 in effect establishes interlocks therebetween which obviates relative movement of the end frame and stator 5 from their predetermined assembly positions. As solidification of molten metal M occurs, the metal shrinks about studs 45 and the cross-members 47 thereof into tight gripping or shrinking engagement therewith; therefore, the inherent shrinking characteristics of solidifying metal is utilized to secure plugs 63 in gripping or mounting engagement with end frame 1. It may also be noted that the solidification of metal M within apertures 27 of beams 7, in effect, forms bars which prevents vertical displacement movement of the beams relative to end frame 1 and secures plugs 63 in gripping or mounting engagement with the beams. In this manner, metallic plugs 63 establish a rigid connection in mounting engagement between end portions 15 of beams 7 and at least a portion, i.e. studs 45, of socket 9.

The fixture is now inverted placing stator 5 over opposite end shield 49 with rotor shaft 37 journaled through bearing 39 of the opposite end shield and with end portions 17 of beams 7 disposed within mating end shield sockets 9. Molten metal M is then introduced or poured into sockets 9 of opposite end shield 49 in which protruding end portions 17 of beam 7 are received thereby to form plugs 63 in the same manner as previously described, and in this manner, the opposite end shield is connected in mounting engagement to beams with the rotor properly positioned therebetween, both axially and radially.

The assembly of stator 5 to end frames 1, 41 by the use of molten metal M introduced into end shield sockets 9 in which portions 15, 17 of beams 7 are disposed offers numerous advantages over prior art assembly methods and dynamoelectric machines, such as those previously described. Radial alignment between stator 5 and the rotor is performed by actually journaling rotor shaft 27 through bearings 39 supported or carried by end shield 1, 41 and this inhibits misalignment between the shaft and bearings and also between the rotor and stator from arising during the assembly of dynamoelectric machine 3. The use of molten metal M negates any need for the use of adhesives such as epoxies and resins which are difficult to handle since they frequently are toxic and have relative long curing times even at elevated temperatures. Some quick curing epoxies are commercially available but their high curing speed initself presents additional handling problems. Furthermore, with adhesives the adhering surfaces must be first cleaned. The use of molten metal or alloys avoids these problems by acting more in the nature of a plug than as an adhesive. It may also be noted that disassembly of dynamoelectric machine 3 is facilitated since such may be effected merely by heating plugs 63 in sockets 9 until metal M of the plugs melt.

With respect to tabs 29, 31, 33 of beams 7, as shown in FIGS. 9–11, it may be noted that molten metal M within sockets 9 would, upon solidifications, also shrink into tight gripping or shrinking engagement with the tabs in the same manner as discussed hereinbefore with respect to socket studs 45 thereby to positively position the beams against displacement from sockets 9.

In FIGS. 12 and 13, it may be noted that metal M, upon solidification will also shrink into tight gripping or shrinking engagement with flange 53 integrally provided on side wall 43 of socket 51 in the same manner as described hereinbefore with respect to studs 45 of sockets 9; therefore, plugs 63, formed by metal M upon solidification thereof, establish a rigid connection in mounting engagement between beams 7 and flange 53 of socket 51.

It may also be noted that socket 55, FIG. 14, obviates the necessity of using pads 59 since integral lower end wall 57 closes the socket for the introduction of molten metal M thereinto. Metallic plug 63, formed upon solidification of molten metal M within socket 55, establishes a rigid connection in mounting engagement between beams 7 and socket 55.

From the foregoing, it is now apparent that a novel method for mounting a structural component 1 of a dynamoelectric machine 3 to a stationary member 5 thereof is provided by way of illustration meeting all of the objects and advantageous features set out hereinabove, as well as others, noted in the specification and that changes may be made to the particular arrangements, shapes and details of component utilized for practicing such methods, as well as variances in the methods, may be made by those skilled in the art without departing from the spirit and scope of the invention, as set out in the claims which follow.

What I claim as new and desire to secure by Letters Patent of the United States is:

1. A method of mounting a structural component of a dynamoelectric machine to a stationary member thereof comprising the steps of:
    a. mounting a set of beams to the stationary member;
    b. positioning end portions of the beams within receiving means provided therefor in the structural component;
    c. introducing molten metal into the receiving means for mounting engagement between the beam end portions and at least a portion of the receiving means; and
    d. solidifying the metal thereby forming means for holding the beam end portions and the receiving means portions in mounting engagement.

2. The method as set forth in claim 1, wherein the solidifying step includes shrinking of the metal upon solidification thereof for gripping engagement with both the beam end portions and the receiving means portions.

3. The method as set forth in claim 1, comprising the intermediate step of closing an end of the receiving means prior to the introducing step.

4. The method as set forth in claim 3, wherein the intermediate step further comprises urging heat resistant means into engagement with the structural component about the receiving means therein.

5. The method as set forth in claim 4, wherein the positioning step comprises spacing the beam end portions from the end of the receiving means for preventing engagement of the beam end portions with the heat resistant means.

6. The method as set forth in claim 1, wherein the positioning step comprises spacing the beam end portions from confronting side walls of the receiving means.

7. The method as set forth in claim 1, comprising the preliminary step of providing means on the beam end portions for engagement with the metal upon the solidifying thereof to prevent displacing the beam end portions from the receiving means.

8. The method as set forth in claim 7, wherein the engagement means includes at least one aperture extending through at least a portion of the beam end portions.

9. The method as set forth in claim 7, wherein the engagement means include tab means integral with the beam end portions and extending therefrom.

10. The method as set forth in claim 1, wherein the receiving means includes sockets having side walls disposed in spaced relation with the beam end portions.

11. The method as set forth in claim 10, wherein the receiving means portions include means integral with the side walls and extending away therefrom into the sockets for gripping engagement with the metal upon the solidifying thereof.

12. The method as set forth in claim 11, wherein the gripping means includes a stud having one end integrally connecting with the side wall and having a cross-member on a free end thereof within the socket.

13. The method as set forth in claim 11, wherein the gripping means includes at least one flange means having one end integrally connecting with the side wall and having a free end disposed within the socket spaced from the side walls.

14. The method as set forth in claim 1, wherein the mounting step further comprises staking the beams into displacement preventing engagement with groove means provided therefor in the stationary member.

15. The method as set forth in claim 1, wherein the introducing step further comprises pouring the molten metal into the receiving means between gaps formed between the beam end portions and the receiving means thereby establishing metal plugs upon the solidifying of the molten metal in mounting engagement between the beam end portions and receiving means portions.

16. The method as set forth in claim 1, comprising the preliminary step of forming means in at least the end portions of the beams for accommodating the passage therethrough of molten metal upon the introduction thereof into the receiving means.

17. The method as set forth in claim 1, wherein the beams are generally U-shaped in cross-section, and wherein the introducing step further comprises pouring the molten metal into the U-shaped beams adjacent the point of entry thereof into the receiving means and flowing the molten metal downwardly within the U-shaped beams into the receiving means.

18. The method as set forth in claim 1, comprising the additional step of securing another structural component to the opposite end portions of the beams.

19. The method as set forth in claim 1, wherein the structural component and stationary member respectively include an end frame and a stator.

20. The method as set forth in claim 1, wherein one end of the receiving means is closed for holding the molten metal therein.

* * * * *